United States Patent
Mills et al.

(10) Patent No.: US 10,282,291 B2
(45) Date of Patent: May 7, 2019

(54) STORAGE SYSTEM WITH DATA MANAGEMENT MECHANISM AND METHOD OF OPERATION THEREOF

(71) Applicant: Enmotus Inc., Aliso Viejo, CA (US)

(72) Inventors: Andrew Mills, Coto de Caza, CA (US); Marshall Lee, Newport Coast, CA (US)

(73) Assignee: Enmotus, Inc., Aliso Viejo, CA (US)

( * ) Notice: Subject to any disclaimer, the term of this patent is extended or adjusted under 35 U.S.C. 154(b) by 306 days.

(21) Appl. No.: 13/866,201

(22) Filed: Apr. 19, 2013

(65) Prior Publication Data

US 2013/0282983 A1   Oct. 24, 2013

Related U.S. Application Data (60) Provisional application No. 61/635,869, filed on Apr. 20, 2012.

(51) Int. Cl.
  *G06F 3/06* (2006.01)
  *G06F 12/0811* (2016.01)
  *G06F 12/0868* (2016.01)

(52) U.S. Cl.
  CPC .......... *G06F 12/0811* (2013.01); *G06F 3/061* (2013.01); *G06F 3/0649* (2013.01); *G06F 3/0685* (2013.01); *G06F 12/0868* (2013.01)

(58) Field of Classification Search
  CPC ........ G06F 3/061; G06F 3/064; G06F 3/0647; G06F 3/0649; G06F 3/0685
  See application file for complete search history.

(56) References Cited

U.S. PATENT DOCUMENTS

| | | | |
|---|---|---|---|
| 6,088,766 A * | 7/2000 | Bachmat | G06F 3/061 711/114 |
| 6,286,092 B1 | 9/2001 | Frank et al. | |
| 8,285,758 B1 | 10/2012 | Bono et al. | |
| 2005/0262323 A1 | 11/2005 | Woo et al. | |
| 2007/0088929 A1* | 4/2007 | Hanai | G06F 3/0605 711/165 |
| 2008/0016308 A1 | 1/2008 | Bartley et al. | |
| 2008/0168228 A1* | 7/2008 | Carr | G06F 3/0605 711/117 |
| 2009/0276564 A1* | 11/2009 | Wong | G06F 12/0246 711/109 |
| 2010/0115186 A1* | 5/2010 | Chang | G06F 12/0246 711/103 |
| 2011/0167217 A1* | 7/2011 | Montgomery | G06F 3/0613 711/114 |
| 2011/0197046 A1 | 8/2011 | Chiu et al. | |

(Continued)

FOREIGN PATENT DOCUMENTS

| | | |
|---|---|---|
| EP | 2354919 | 8/2011 |
| WO | WO2010085228 | 7/2010 |

*Primary Examiner* — Nanci N Wong
(74) *Attorney, Agent, or Firm* — Perspectives Law Group, Corp.

(57) ABSTRACT

A method of operation of a storage system includes: accessing a storage tier manager coupled to a first tier storage and a second tier storage; identifying a low activity region in the first tier storage and a high activity region in the second tier storage; and exchanging a physical block region corresponding to the high activity region with the physical block region corresponding to the low activity region by the storage tier manager.

25 Claims, 8 Drawing Sheets

(56) References Cited

U.S. PATENT DOCUMENTS

2012/0278569 A1* 11/2012 Kawakami ............ G06F 3/0608
  711/162
2013/0024650 A1 1/2013 Ambat et al.

* cited by examiner

STORAGE SYSTEM WITH DATA MANAGEMENT MECHANISM AND METHOD OF OPERATION THEREOF

CROSS-REFERENCE TO RELATED APPLICATION(S)

This application claims the benefit of U.S. Provisional Patent Application Ser. No. 61/635,869 filed Apr. 20, 2012, and the subject matter thereof is incorporated herein by reference thereto.

TECHNICAL FIELD

An embodiment of the present invention relates generally to a storage system, and more particularly to a storage system having multiple tiers of storage media having different performance capabilities.

BACKGROUND

As the volume and intensity of information transactions continue to increase, individuals and businesses seek additional ways to process and store data and applications. One option available to users of information is a storage system. The storage system generally stores, protects, and/or communicates information or data for business, personal, or other purposes, thereby allowing users to access the information whenever necessary.

Because information handling requirements vary between different users or applications, information storage systems may include cache memory to temporarily hold information, which might be more frequently accessed or modified, in order to provide a quicker access path to the information. The cache memory can require special firmware support in order to improve the efficiency of its use. For example the cache memory can use a least most recently used (LMRU) algorithm or a most recently used (MRU) algorithm in order to utilize the cache for the best performance of the storage system. These caching algorithms can improve performance on some repeated read sequences, but are completely ineffective for random read operations or for sequential read operations. Once the information is moved out of the cache memory to a long term storage device, the access time can be much slower.

Thus, a need still remains for a storage system with data management mechanism to improve performance and accessibility of user data. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a storage system including: accessing a storage tier manager coupled to a first tier storage and a second tier storage; identifying a low activity region in the first tier storage and a high activity region in the second tier storage; and exchanging a physical block region corresponding to the high activity region with the physical block region corresponding to the low activity region by the storage tier manager.

An embodiment of the present invention provides a method of operation of a storage system including: accessing a storage tier manager coupled to a first tier storage and a second tier storage including communicating through a bus driver interface module; identifying a low activity region in the first tier storage and a high activity region in the second tier storage including comparing by a promotion threshold module the promotion criteria and the high activity region; exchanging a physical block region corresponding to the high activity region with the physical block region corresponding to the low activity region by the storage tier manager; and updating a virtual to physical list by the storage tier manager to reflect a new location of the physical block region corresponding to the high activity region.

An embodiment of the present invention provides a storage system, including: a storage tier manager coupled to a first tier storage and a second tier storage; a high performance storage device, in the first tier storage, having a low activity region; a low performance storage device, in the second tier storage, having a high activity region; and a physical block region corresponding to the high activity region in the low performance storage device exchanged with the physical block region corresponding to the low activity region in the high performance storage device by the storage tier manager; and a storage media interface module, coupled to the storage tier manager, for exchanging a physical block region corresponding to the high activity region in the low performance storage device exchanged with the physical block region corresponding to the low activity region in the high performance storage device by the storage tier manager.

An embodiment of the present invention provides a non-transitory computer readable media including: accessing a storage tier manager coupled to a first tier storage and a second tier storage; identifying a low activity region in the first tier storage and a high activity region in the second tier storage; and exchanging a physical block region corresponding to the high activity region with the physical block region corresponding to the low activity region by the storage tier manager.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "tier" referred to herein is a group or array of storage media devices that have a common performance characteristic. The term "performance characteristic" referred to herein is a measure of data handling capability that can include any device operation and interface timing Examples of the performance characteristic can include access time, data through-put, interface bandwidth, input-output operations per second (IOPS), and data priority. The term "storage media device" referred to herein is an apparatus used for archiving and accessing of data in a computer system environment. For example, the storage media device can be a magnetic disk drive, a solid state disk drive, an optical disk drive, magnetic tape drive, or the like without regard to the interface attachment used. The term "virtual storage" referred to herein is the total addressable memory available to a computer system that is composed of one or more memory devices, each of which represents a portion of the total addressable memory. The virtual storage is addressed by a virtual address that is translated to a physical address within the one or more memory devices.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
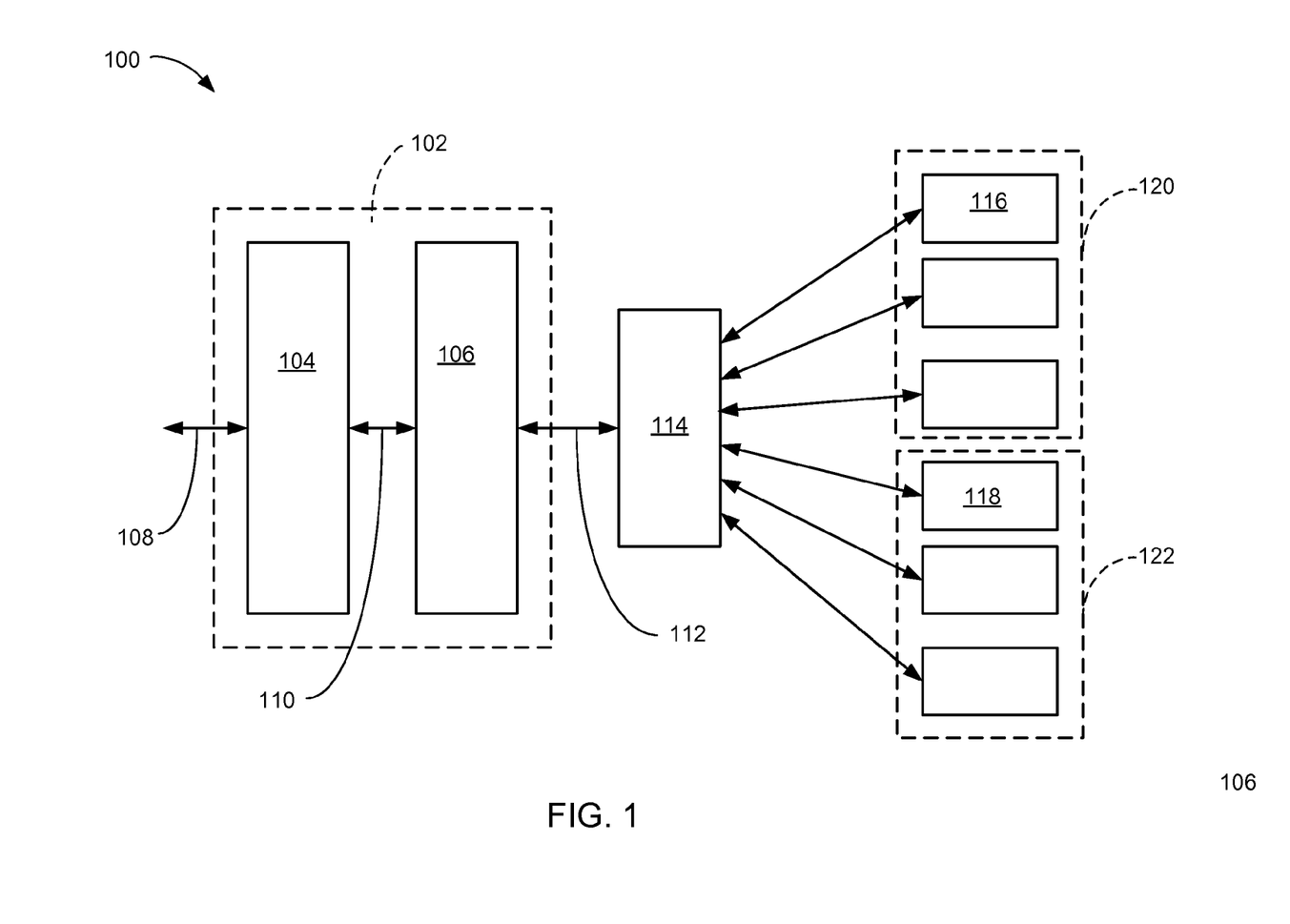
FIG. 1 is a block diagram of a storage system with data management mechanism in an embodiment of the present invention.

Referring now to FIG. 1, therein is shown a block diagram of a storage system 100 with data management mechanism in an embodiment of the present invention. The block diagram of the storage system 100 depicts a block level storage processor 102 including a bus driver interface module 104 and a storage tier manager 106. The storage tier manager 106 can be a processor or embedded processor configured to control the bus driver interface module 104 and manage the operations of the block level storage processor 102. The bus driver interface module 104 can implement the protocol associated with communicating to a next level system (not shown).

The block level storage processor 102 is capable of performing a variety of storage virtualization functions, including block level tiering, virtual to physical device mapping and other data management functions. The block level storage processor 102 can be implemented as instructions on a non-transitory computer readable medium (not shown) to be executed by a system processor (not shown). The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the system or installed as a removable of the system. The block level storage processor 102 can be implemented as a combination of flexible or dedicated hardware executing the instructions from the non-transitory computer readable medium or it can be implemented from dedicated hardware modules.

An interface bus 108 can couple the bus driver interface module 104 to the next level system (not shown). The interface bus 108 can provide a bi-directional communication path between the storage system 100 and the next level system (not shown). The interface bus 108 can be a parallel bus, a serial bus, an electronic connection, an optical connection, or a wireless connection used to communicate with and deliver data to the block level storage processor 102. The bus driver interface module 104 can be coupled to the storage tier manager 106 by a data manager bus 110. The data manager bus 110 can receive or drive the data and interface exchanges to the interface bus 108.

A media interface bus 112 can couple the storage tier manager 106 to a storage media interface module 114. The media interface bus 112 can provide a communication path to allow transfer of blocks of data and set-up information between the storage tier manager 106 and the storage media interface module 114. The storage media interface module 114 can implement the communication protocol for a high performance storage device 116 and a low performance storage device 118.

The high performance storage device 116 can be identical to the low performance storage device 118, but more often they differ in terms of performance, capacity, cost, power consumption, and input-output operations per second (IOPS). An array of the high performance storage device 116 can form a first tier storage 120 and can include semiconductor based storage elements such as NAND flash based devices in the form of discrete components, standalone solid state disks (SSDs), or very high performance serial attached SCSI (SAS) disk drives. An alternate array of the low performance storage device 118, can form a second tier storage 122, such as serial advanced technology attach (SATA), serial attached SCSI (SAS), network attached storage, or other slower forms of media.

A transfer of blocks of data through the block level storage processor 102 can be initially stored in either the first tier storage 120 or the second tier storage 122. Any subsequent access of the blocks of data can be analyzed by the storage tier manager 106. The storage tier manager 106 can monitor the accesses to determine which of the blocks of data are most frequently accessed reads, reads and writes combined, streaming or random access characteristics, and the like.

If the storage tier manager 106 determines that any of the blocks of data are incorrectly located in the low performance storage device 118 due to a high frequency of accesses, the storage tier manager 106 can exchange the blocks of data with the blocks of data on the high performance storage device 116. The storage tier manager 106 can also identify the blocks of data incorrectly located on the high performance storage device 116 due to a low frequency of access and exchange the blocks of data with the low performance storage device 118. This exchange of the data blocks between the first tier storage 120 and the second tier storage 122 can optimize the performance of the storage system 100.

The determination of which of the blocks of data should be exchanged between the first tier storage 120 and the second tier storage 122 is controlled by the storage tier manager 106. The actual process of the exchange of the blocks of data between the first tier storage 120 and the second tier storage 122 can be executed by the storage tier manager 106 and the storage media interface module 114 without interaction from the next level system (not shown).

It is understood that the storage system 100 having the first tier storage 120 and the second tier storage 122 is an example only and any number of additional tiers of storage can be implemented. It is further understood that the array of the high performance storage device 116 shown in the first tier storage 120 is an example only and any number of the high performance storage device 116 can be included in the array. Likewise the alternate array of the low performance storage device 118 in the second tier storage 122 is an example only and any number of the low performance storage device 118 can be included in the alternate array. It is further understood that the first tier storage 120 and the second tier storage 122 can be any combination of solid state flash based memory or derivatives, phase change memory, volatile and non-volatile random access memory, rotating media, or serial tape streaming.

It has been discovered that the block level storage processor 102 can determine regions, within each of the first tier storage 120 and the second tier storage 122, identified as having high priority attributes residing on the low performance storage device 118 and low priority attributes on the high performance storage device 116. The block level storage processor 102 can autonomously exchange the blocks of data between the first tier storage 120 and the second tier storage 122 in order to improve the performance of the storage system 100. The storage tier manager 106 can maintain a prioritized table in internal memory or a private region of the storage media of these high and low priority regions for the purposes of deciding if they need to be exchanged based on user programmable or a default set of promotion policies.

Figure 2:
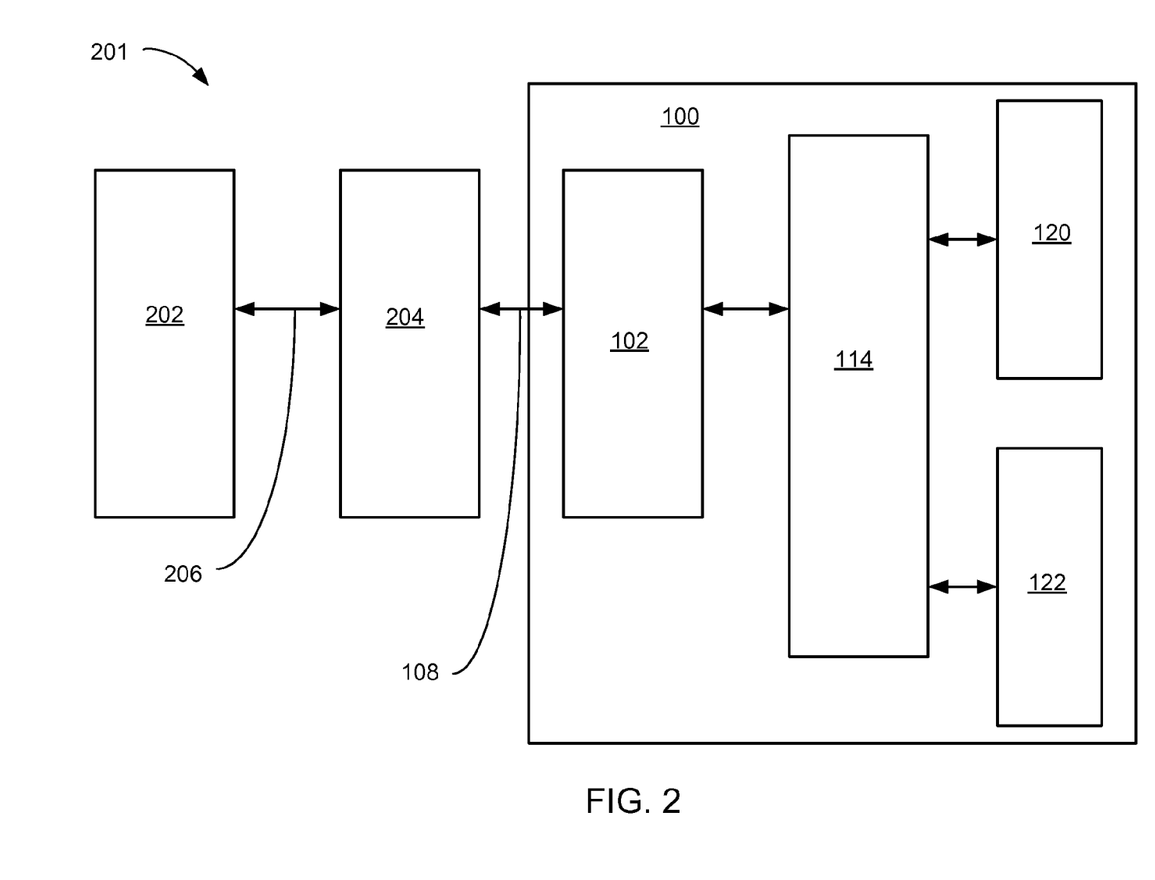
FIG. 2 is a block diagram of an example application of the storage system of FIG. 1.

Referring now to FIG. 2, therein is shown a block diagram of an example application 201 of the storage system 100 of FIG. 1. The block diagram of an example application 201 of the storage system 100 depicts a system processor 202 coupled to an interface bus controller 204 by a processor bus 206.

The interface bus controller 204 can drive the interface bus 108 in order to send and receive commands and data between the system processor 202 and the block level storage processor 102. The interface bus 108 can be a parallel bus, a serial bus, an electronic connection, an optical connection, or a wireless connection used to communicate with and deliver data between the block level storage processor 102 and the system processor 202.

The system processor 202 can access applications or data from the first tier storage 120 or the second tier storage 122. The block level storage processor 102 can monitor the statistics of the blocks of data accessed by the system processor 202 to determine the proper priority of the blocks of data and whether an exchange of the blocks of data is required. The block level storage processor 102 can exchange the blocks of data between the first tier storage 120 and the second tier storage 122 without the knowledge or assistance of the system processor 202.

If the block level storage processor 102 determines that the exchange of the blocks of data is required, the storage media interface module 114 can be set-up to perform the exchange while accesses by the system processor 202 continue unimpeded. The transfer of the blocks of data from, the first tier storage 120 to the second tier storage 122 and vice versa, are executed by the block level storage processor 102 and the storage media interface module 114 without the knowledge or assistance of the system processor 202.

It has been discovered that the storage system 100 can improve the performance of the example application 201 by maintaining the most used of the blocks of data in the first tier storage 120 and the least used of the blocks of data in the second tier storage 122. The exchange of the blocks of data between the first tier storage 120 and the second tier storage 122 can be performed by the block level storage processor 102 and the storage media interface module 114 without adding any overhead or extra commands to the execution of the system processor 202.

Figure 3:
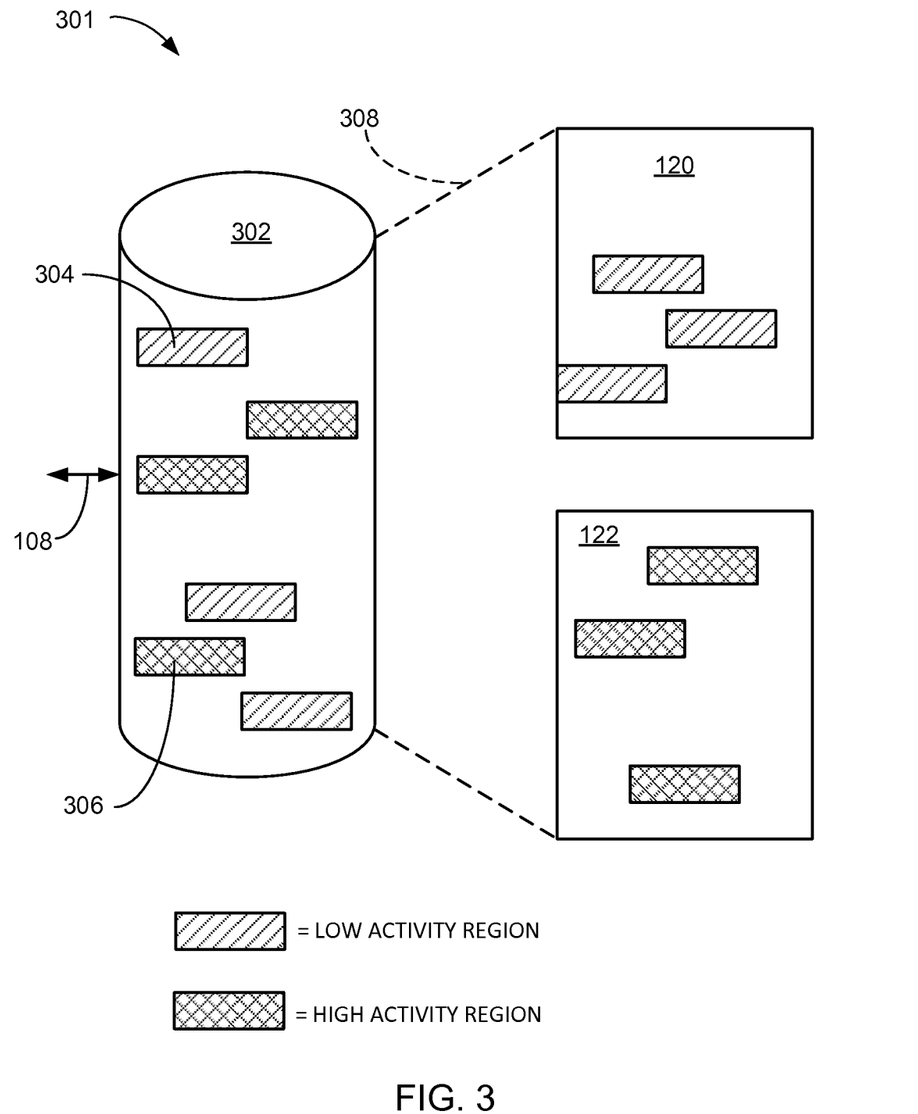
FIG. 3 is an exemplary block diagram of a virtual to physical translation for the storage system of FIG. 1.

Referring now to FIG. 3, therein is shown an exemplary block diagram of a virtual to physical translation 301 for the storage system 100 of FIG. 1. The exemplary block diagram of the virtual to physical translation 301 for the storage system 100 depicts a virtual storage capacity 302 having a low activity region 304, represented by a diagonal patterned rectangle, and a high activity region 306, represented by a cross-hatch patterned rectangle, distributed therein.

A virtual to physical conversion 308 can be performed by the storage tier manager 106 of FIG. 1. In the initial writing of the low activity region 304 and the high activity region 306, their physical location may not reflect the proper priority. The low activity region 304 represents a portion of the first tier storage 120 that is least-frequently accessed, making the low activity region 304 a low priority data that is stored in the high priority and high performance space of the first tier storage 120. The high activity region 306 represents a portion of the second tier storage 122 that is most-frequently accessed, making the high activity region 306 a high priority data that is stored in the low priority and low performance space of the second tier storage 122.

As the low activity region 304 and the high activity region 306 are accessed by the system processor 202, a priority can be determined by the storage tier manager 106. If the storage tier manager 106 determines that the first tier storage 120 has been written with the low activity region 304 and the second tier storage 122 has been written with the high activity region 306, an exchange of the blocks of data can be scheduled for the storage media interface module 114 of FIG. 1 by the storage tier manager 106.

The block level storage processor 102 can determine the priorities based on any number of criteria, for example most frequently accessed reads, reads and writes combined, streaming, or random access characteristics, and least frequently accessed reads. If the priority exceeds a predetermined threshold, the storage tier manager 106 can exchange the low activity region 304 in the first tier storage 120 for the high activity region 306 in the second tier storage 122.

It is understood that the exchange of the low activity region 304 and the high activity region 306 can improve the performance of the high activity region 306 and make little difference to the availability of the low activity region 304. The storage tier manager 106 can coordinate the exchange of the low activity region 304 and the high activity region 306 while allowing the system processor 202 continue accessing to the high activity region 306. When the exchange is complete, the storage tier manager 106 can update the virtual-to-physical table to reflect the new physical locations without changing the virtual address for the system processor 202. In this way the change in physical location can occur without the system processor 202 being aware of the change in physical location of the low activity region 304 and the high activity region 306.

Figure 4:
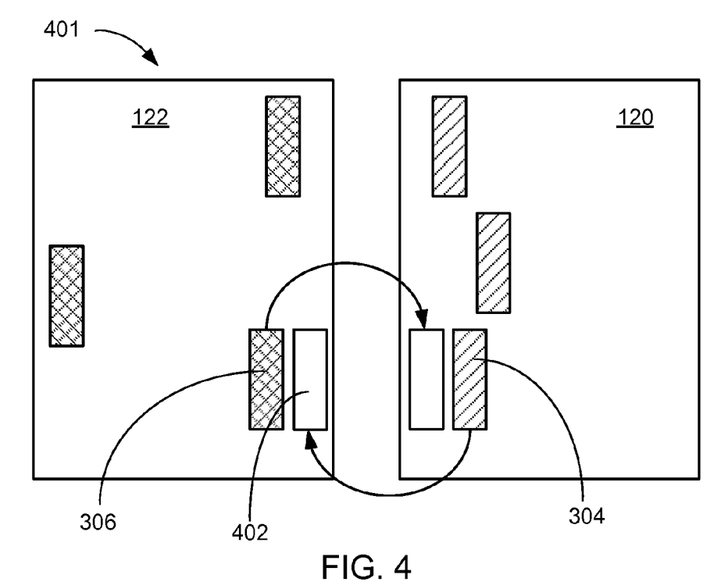
FIG. 4 is a pictorial example of an exchange of the high activity region for the low activity region in the storage system of FIG. 1.

Referring now to FIG. 4, therein is shown a pictorial example of an exchange 401 of the high activity region 306 for the low activity region 304 in the storage system 100 of FIG. 1. The pictorial example of the exchange 401 of the high activity region 306 for the low activity region 304 depicts a destination region 402 in the first tier storage 120 for receiving the high activity region 306 from the second tier storage 122.

The destination region 402 in the second tier storage 122 can receive the low activity region 304 from the first tier storage 120. When the exchange 401 is complete, the storage tier manager 106 of FIG. 1 can update a virtual-to-physical table within the storage system 100 for indicating the new physical location of the low activity region 304 and the high activity region 306. If a read command addresses the high activity region 306 prior to the update of the virtual-to-physical table, the high activity region 306 would be available from its initial location. After the update of the virtual-to-physical table, the high activity region 306 would be read from the new location in the first tier storage 120. This process assures that the blocks of data within the high activity region 306 are protected even in the event of a power failure during the exchange because the exchange does not take effect until the virtual-to-physical table is updated. The virtual-to-physical table is updated only once to reflect the exchange of the blocks of data for the low activity region 304 and the high activity region 306.

It has been discovered that the storage system 100 provides the means for determining a priority of the blocks of data based on characterization of data access patterns, such as prioritization of streaming versus random data access patterns, accesses that vary based on time of day, accesses that vary based on predominant reads versus writes, frequency of access, and other criteria that can be defined by the user. By performing the exchange 401 when the priority has been met, the storage system 100 can improve the performance of the system processor 202 of FIG. 2 by moving the high activity region 306 to the first tier storage 120 in order to take advantage of the higher performance of the high performance storage device 116 of FIG. 1.

Figure 5:
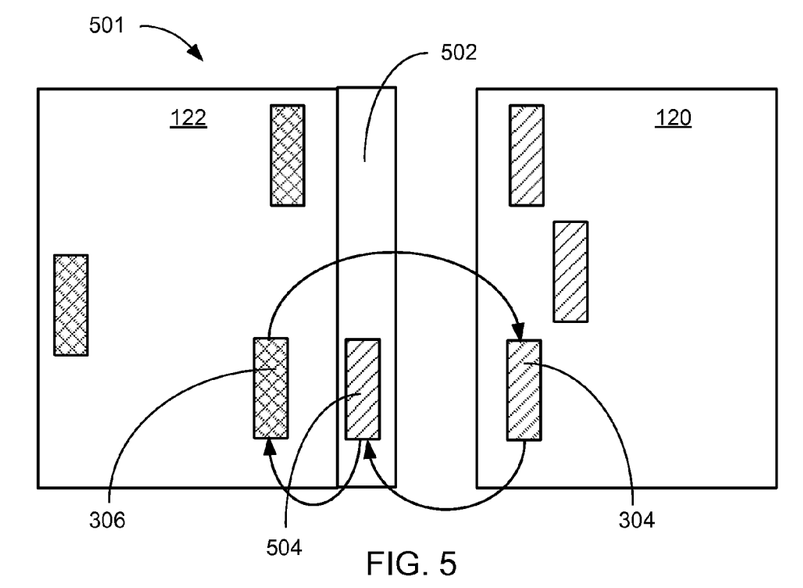
FIG. 5 is a pictorial example of a secure exchange of high activity regions for low activity regions in the storage system of FIG. 1.

Referring now to FIG. 5, therein is shown a pictorial example of a secure exchange 501 of high activity regions 306 for low activity regions 304 in the storage system 100 of FIG. 1. The pictorial example of the secure exchange 501 depicts a reserved section 502 of the second tier storage 122 that can be used to hold a low activity region copy 504 during the exchange.

The secure exchange 501 can be considered a two-hop transfer. In preparation for the secure exchange 501, the low activity region 304 can be copied into the reserved section 502. The virtual-to-physical table can be updated by the storage tier manager 106 of FIG. 1 in order to reflect the new physical address for the low activity region 304. The high activity region 306 can then be copied to the location in the first tier storage 120 that was occupied by the low activity region 304. The virtual-to-physical table can be updated by the storage tier manager 106 to reflect the new location of the high activity region 306.

Once the high activity region 306 has been transferred to the first tier storage 120, the low activity region copy 504 can be copied from the reserved section 502 to the second tier storage 122 and the virtual-to-physical table can be updated by the storage tier manager 106 to reflect the move of the low activity region 304. This process requires three updates to the virtual-to-physical table. Alternatively the reserved section 502 can be considered a reserved capacity somewhere within the second tier storage 122. This would remove the necessity for a second transfer of the low activity region 304 and the capacity vacated by the transfer of the high activity region 306, to the first tier storage 120, can be added to the reserved section 502. The alternative process requires the virtual-to-physical table to be updated twice.

Figure 6:
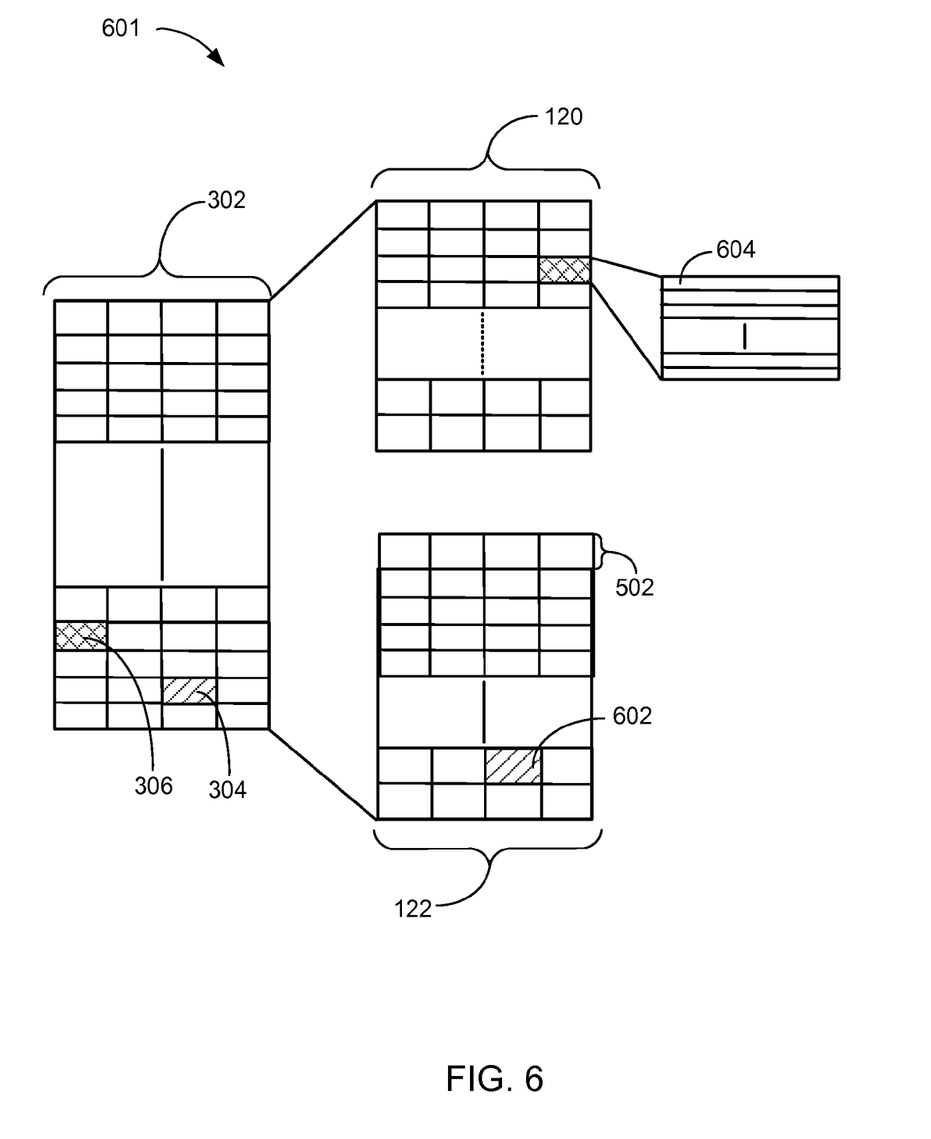
FIG. 6 is a pictorial example of a virtual to physical translation for the storage system of FIG. 1.

Referring now to FIG. 6, therein is shown a pictorial example of a virtual to physical translation 601 for the storage system 100 of FIG. 1. The pictorial example of the virtual to physical translation 601 depicts the virtual storage capacity 302 having the high activity region 306.

The virtual storage capacity 302 can be mapped to the first tier storage 120 and the second tier storage 122. It is understood that additional tiers of the physical storage devices can be implemented. For ease of discussion only the first tier storage 120 and the second tier storage 122 are shown. The high activity region 306 can be located within one of the high performance storage device 116 of FIG. 1. The physical location of the high activity region 306 can be a physical block region 602.

The physical block region 602 can be composed of a number of a block of data 604. The block of data 604 can include the physical mapping of the data into sectors on the physical media. The high performance storage device 116 can be a block addressed device that maintains a separate mapping structure for locating the data sectors (not shown) associated with the block of data 604.

It is understood that physical block region 602 can extend across the boundary of the high performance storage device 116 if additional capacity is used by the high activity region 306. The virtual-to-physical table used for mapping of the high activity region 306 to the physical block region 602 is maintained by the storage tier manager 106 of FIG. 1.

In some embodiments the second tier storage 122 can include the reserved section 502. While the reserved section is shown as a single line of the physical block region 602, it is understood that any number of the physical block region 602 can be included in the reserved section 502. It is also understood that the physical block region 602 associated with the reserved section 502 can be distributed throughout the second tier storage 122.

Likewise it is understood that the low activity region 304 can be mapped to the physical block region 602 located in the second tier storage 122. Since the second tier storage 122 is composed of the low performance storage device 118 of FIG. 1, a different number of the block of data 604 can make-up the physical block region 602 for the low activity region 304. It is understood that the physical capacity of the low activity region 304 and the high activity region 306 is the same. It is further understood that the high performance storage device 116 and the low performance storage device 118 can be the same device type or a different device type.

It is understood that the first tier storage 120 can also include the reserved section 502. The implementation of the first tier storage 120 and the second tier storage 122 can depend on the configuration of the storage system 100 of FIG. 1 and the type of the exchange 401 of FIG. 4 or the secure exchange 501 of FIG. 5 implemented. The entire capacity of the first tier storage 120 and the second tier storage 122 can be made-up of a number of the physical block region 602.

Figure 7:
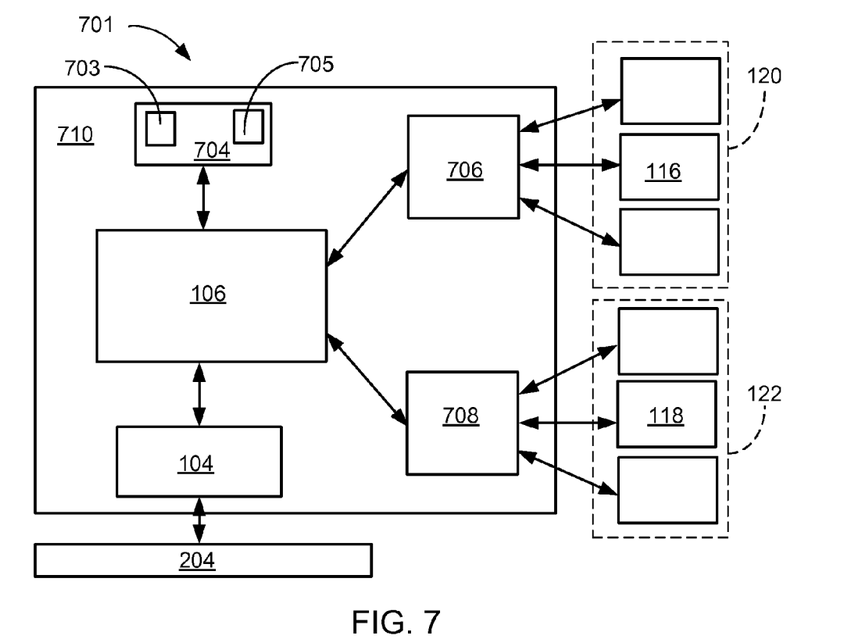
FIG. 7 is a functional block diagram of a host bus adapter implementation of the storage system of FIG. 1.

Referring now to FIG. 7, therein is shown a functional block diagram of a host bus adapter implementation 701 of the storage system 100 of FIG. 1. The functional block diagram of the host bus adapter implementation 701 depicts a storage tier manager 106 which keeps usage statistics 703, for the first tier storage 120 and the second tier storage 122, in a memory device 704. The storage tier manager 106 can monitor each access to the first tier storage 120 and the second tier storage 122 for generating the usage statistics 703. The usage statistics 703 can be evaluated based on the priorities established for determining the low activity region 304 of FIG. 3 and the high activity region 306 of FIG. 3.

The memory device 704 can be a discrete memory component or an embedded memory component in the storage tier manager 106. The implementation of the storage tier manager 106 and the memory device 704 can operate in the same fashion as the storage tier manager 106 with an embedded instance of the memory device 704.

The storage tier manager 106 can perform a virtual-to-physical mapping function, which is employed to map the multiple physical devices into the virtual storage capacity 302 of FIG. 3 that is presented to and accessed by the system processor 202 of FIG. 2. A virtual-to-physical table 705 can be maintained in the memory device 704 for identifying the physical block region 602 of FIG. 6 associated with the low activity region 304 and the high activity region 306 that are determined from the usage statistics 703.

The storage tier manager 106 can be coupled to a first tier controller 706 and a second tier controller 708. The combination of the first tier controller 706, the second tier controller 708, and the storage tier manager 106 can provide the function of the storage media interface module 114 of FIG. 1. In order to execute the exchange 401 of FIG. 4, the storage tier manager 106 must individually coordinate the movement of the low activity region 304 of FIG. 3 and the high activity region 306 of FIG. 3 through the first tier controller 706 and the second tier controller 708.

The first tier controller 706 can be coupled to the first tier storage 120, which is composed of a number of the high performance storage device 116. The high performance storage device 116 can include semiconductor based solid state drives (SSD), very high performance magnetic disks such as serial attached small computer system interface (SAS) disk drives rotating at 10,000-15,000 RPM. The first tier controller 706 can be coupled to the individual units of the high performance storage device 116 as shown or it can be coupled through a single high performance interface, such as an optical interface, to an enclosure (not shown) that houses the first tier storage 120.

The second tier controller 708 can be coupled to the second tier storage 122, which is composed of the low performance storage device 118. The low performance storage device 118 can include a serial advanced technology attachment (SATA) drive, a network attached storage (NAS), or a serial attached small computer system interface (SAS) disk drives rotating at 7200 RPM. The second tier controller 708 can be coupled to the individual units of the low performance storage device 118 as shown or it can be coupled through a single high performance interface, such as an optical interface, to an enclosure (not shown) that houses the second tier storage 122.

The storage tier manager 106 can be coupled to the bus driver interface module 104 for communicating with the system processor 202 of FIG. 2 through the interface bus controller 204. It is understood that the interface bus controller 204 can include attachment hardware and electronics required to allow the insertion of a block level tiering adapter 710 composed of the storage tier manager 106, the memory device 704, the first tier controller 706, the second tier controller 708, and the bus driver interface module 104 mounted on a pluggable printed circuit board.

It has been discovered that the storage system 100 can be implemented as the block level tiering adapter 710 coupled to the first tier storage 120 and the second tier storage 122. The implementation of the block level tiering adapter 710 can provide an upgrade path to include the storage system 100 to an existing computer system (not shown) with no modifications required to the existing computer system. During the operation of the block level tiering adapter 710, the storage tier manager 106 can keep usage statistics 703 of the physical block region 602 corresponding to the high activity region 306 and the physical block region 602 corresponding to the low activity region 304. The storage tier manager 106 can keep the usage statistics 703 in the memory device 704.

Figure 8:
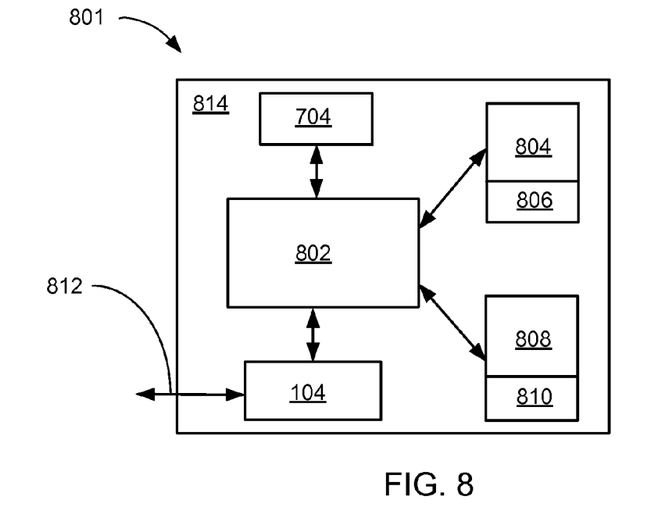
FIG. 8 is a functional block diagram of a network attached implementation of the storage system.

Referring now to FIG. 8, therein is shown a functional block diagram of a network attached implementation 801 of the storage system 100 of FIG. 1. The functional block diagram of the network attached implementation 801 depicts the storage tier manager 802 coupled to the memory device 704. The tier storage manager 802 can include the functions performed by the tier storage manager 106 of FIG. 1 and the storage media interface module 114 of FIG. 1. The storage tier manager 802 can be coupled to a first solid state drive controller 804 coupled to a first storage array 806 such as an array of single level code (SLC) NAND flash devices or phase change memory (PCM) devices.

The storage tier manager 802 can also be coupled to a second solid state drive controller 808. The second solid state drive controller 808 can be coupled to a second storage array 810 such as an array of multi-level code (MLC) NAND flash devices.

The storage tier manager 802 can be coupled to the bus driver interface module 104 for communicating with the next level system (not shown). The bus driver interface module 104 can support a serial interface 812 such as a serial optical interface or a serial electrical interface. The serial interface 812 can include a serial attached SCSI (SAS), Serial advanced technology attachment (SATA), or an Internet Small Computer System Interface (iSCSI) interface for communicating with the next level system.

An enclosure 814 can house the storage tier manager 802, the memory device 704, the first solid state drive controller 804, the first storage array 806, the second solid state drive controller 808, the second storage array 810, and the bus driver interface module 104 mounted on a printed circuit board with power supplies, fans and connectors (not shown).

Figure 9:
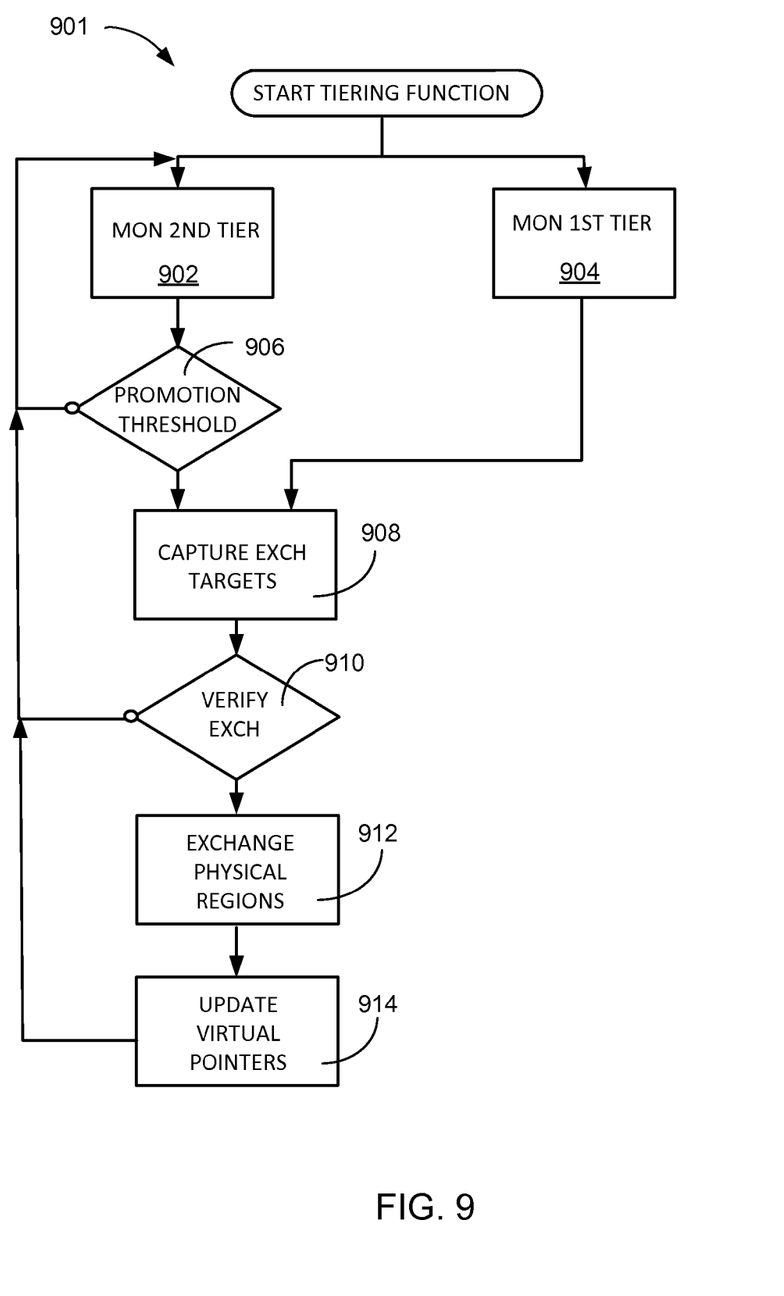
FIG. 9 is a flow chart of the detailed operation of the storage system of FIG. 1.

Referring now to FIG. 9, therein is shown a flow chart 901 of the detailed operation of the storage system 100 of FIG. 1. The flow chart 901 depicts a monitor second tier module 902 and a monitor first tier module 904 that can operate concurrently.

The monitor second tier module 902 can compile a table of the most frequently accessed regions of the second tier storage 122 of FIG. 1. The regions can be the physical block regions 602 of FIG. 6 and can include a specific number of the blocks of data 604 of FIG. 6.

The monitor first tier module 904 can compile a table of the accesses in the first tier storage 120 of FIG. 1 in order to identify the least frequently accessed regions. The regions in the first tier storage 120 are defined to be the same capacity as the physical block regions 602, but can include a different number of the blocks of data 604 if the format of the high performance storage device 116 of FIG. 1 found in the first tier storage 120 is different from the format of the low performance storage device 118 of FIG. 1 found in the second tier storage 122.

The monitor second tier module 902 is checked by a promotion threshold module 906, which can compare the usage statistics 703 of FIG. 7 to a threshold determined by promotion criteria, in order to determine whether there is a candidate among the physical block region 602 of the second tier storage 122 that should be promoted to the first tier storage 120. The promotion criteria can be characterizations of data access patterns, accesses based on time of day, most frequently accessed reads, reads and writes combined, streaming reads, or the like. The threshold for promotion can be determined by user input or system defaults and compared to the usage statistics 703 of the candidates among the physical block region 602 of the second tier storage 122.

If the promotion threshold is not met the flow returns to the monitor second tier module 902 and monitor first tier module 904 in order to await the next promotion opportunity. If however the promotion threshold is met, the flow proceeds to a capture exchange targets module 908.

The capture exchange targets module 908 can capture the least frequently accessed regions in the first tier storage 120 from the monitor first tier module 904 and the most frequently accessed regions of the second tier storage 122 from the monitor second tier module 902. The input from the monitor first tier module 904 represents the physical block region 602 that is least active in the first tier storage 120. The input from the monitor second tier module 902 represents the physical block region 602 that is most active in the second tier storage 122.

The flow then proceeds to a verify exchange module 910, in which the storage tier manager 106 of FIG. 1 verifies that the physical block region 602 that is least active in the first tier storage 120 is less active than the physical block region 602 that is most active in the second tier storage 122. This check can verify that a heavily burdened storage system 100 does not execute exchanges of the physical block regions 602 that would reduce the throughput of the storage system 100.

If the verify exchange module 910 determines that the physical block region 602 that is least active in the first tier storage 120 is more active than the physical block region 602 that is most active in the second tier storage 122, no exchange is allowed and the flow returns to the monitor second tier module 902 and monitor first tier module 904 in order to await the next promotion opportunity. If the verify exchange module 910 determines that the physical block region 602 that is least active in the first tier storage 120 is indeed less active than the physical block region 602 that is most active in the second tier storage 122, the flow proceeds to an exchange physical regions module 912.

The exchange physical regions module 912 can instruct the storage media interface module 114 of FIG. 1 to move the identified units of the physical block region 602 in the mode of the exchange 401 of FIG. 4 or the secure exchange 501 of FIG. 5. It is understood that the exchange of the physical block region 602 can be performed concurrently to the destination region 402 of FIG. 4 located in the first tier storage 120 and the second tier storage 122, or sequentially with the use of the reserved section 502 of FIG. 5. Other implementations are possible through the use of the memory device 704 to act as a temporary holding location during the transfer.

Upon completion of the transfer the flow proceeds to an update virtual pointers module 914. The update virtual pointers module 914 provides the new locations of the physical block region 602 transferred between the first tier storage 120 and the second tier storage 122 in the virtual-to-physical table 705 of FIG. 7.

The storage system 100 has been described with module functions or order as an example. The storage system 100 can partition the modules differently or order the modules differently. For example, the monitor second tier module 902 and monitor first tier module 904 can operate from a single list of activity of the physical block region 602 in both the first tier storage 120 and the second tier storage 122. The description used was intended to provide clarity to the operation of an embodiment of the present invention without limiting it to only that implementation.

The modules described in this application can be hardware implementation or hardware accelerators in storage tier manager 106 of FIG. 1. The modules can also be hardware implementation or hardware accelerators within the storage tier manager 106 of FIG. 1.

Figure 10:
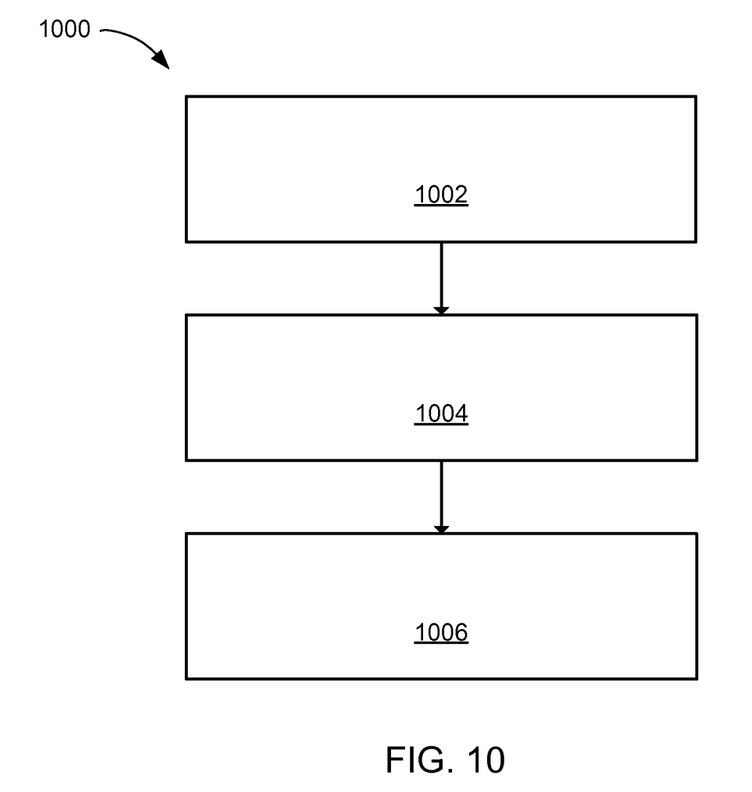
FIG. 10 is a flow chart of the method of operation of a storage system in an embodiment of the present invention.

Referring now to FIG. 10, therein is shown a flow chart of a method 1000 of operation of a storage system 100 in an embodiment of the present invention. The method 1000 includes: accessing a storage tier manager coupled to a first tier storage and a second tier storage in a block 1002; identifying a low activity region in the first tier storage and a high activity region in the second tier storage in a block 1004; and exchanging a physical block region corresponding to the high activity region with the physical block region corresponding to the low activity region by the storage tier manager in a block 1006.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a storage system comprising:
receiving a command, from a system processor, through an interface bus;
accessing a storage tier manager, based on the command from the system processor, coupled to a first tier storage and a second tier storage;
identifying a low activity region in the first tier storage and a high activity region in the second tier storage;
exchanging a physical block region data, accessed by the command from the system processor, corresponding to the high activity region with the physical block region corresponding to the low activity region, by the storage tier manager performing the exchange during the access of the data for the command, when the storage tier manager determines a priority exceeds a predetermined threshold; and
wherein exchanging the physical block region data comprises:
copying the low activity region to a reserved section located in the first or the second tier storage;
updating the physical address of the low activity region in a virtual-to-physical table;
copying the high activity region to the location in the first tier storage previously occupied by the low activity region;
updating the physical address of the high activity region in the virtual-to-physical table;
copying the low activity region from the reserved section to the second tier storage previously occupied by the high activity region;
updating the physical address of the low activity region in the virtual-to-physical table.

2. The method as claimed in claim 1 further comprising generating usage statistics by the storage tier manager for identifying the low activity region and the high activity region.

3. The method as claimed in claim 1 wherein exchanging the physical block region corresponding to the high activity region includes comparing usage statistics of the high activity region.

4. The method as claimed in claim 1 wherein exchanging the physical block region corresponding to the high activity region with the physical block region corresponding to the low activity region by the storage tier manager includes updating the virtual-to-physical table by the storage tier manager.

5. The method as claimed in claim 1 further comprising exchanging, by a storage media interface module, the physical block region corresponding to the high activity region with the physical block region corresponding to the low activity region.

6. A method of operation of a storage system comprising:
receiving a command, from a system processor, through an interface bus;
accessing a storage tier manager, based on the command from the system processor, coupled to a first tier storage and a second tier storage including communicating through a bus driver interface module;
identifying a low activity region in the first tier storage and a high activity region in the second tier storage including comparing by a promotion threshold module the promotion criteria and the high activity region;
exchanging a physical block region data, accessed by the command from the system processor, corresponding to the high activity region with the physical block region corresponding to the low activity region, by the storage tier manager performing the exchange during the access of the data for the command, when the storage tier manager determines a priority exceeds a predetermined threshold; and
wherein exchanging the physical block region data comprises:
copying the low activity region to a reserved section located in the first or the second tier storage;
updating the physical address of the low activity region in a virtual-to-physical table;
copying the high activity region to the location in the first tier storage previously occupied by the low activity region;
updating the physical address of the high activity region in the virtual-to-physical table;
copying the low activity region from the reserved section to the second tier storage previously occupied by the high activity region;
updating the physical address of the low activity region in the virtual-to-physical table.

7. The method as claimed in claim 6 further comprising generating usage statistics by the storage tier manager for identifying the low activity region and the high activity region including transmitting through an interface bus controller to the bus driver interface module.

8. The method as claimed in claim 6 wherein exchanging the physical block region corresponding to the high activity region includes comparing usage statistics of the high activity region including reading a memory device for determining the usage statistics of the high activity region and the low activity region.

9. The method as claimed in claim 6 wherein exchanging the physical block region corresponding to the high activity region with the physical block region corresponding to the low activity region by the storage tier manager includes updating the virtual-to-physical table, in a memory device, by the storage tier manager.

10. The method as claimed in claim 6 further comprising exchanging, by a storage media interface module, the physical block region corresponding to the high activity region with the physical block region corresponding to the low activity region including copying, to a reserved section, the low activity region.

11. A storage system comprising:
an interface bus configured to receive a command from a system processor;
a storage tier manager, coupled to the interface bus, a first tier storage, and a second tier storage, configured to execute the command from the system processor;
a high performance storage device, in the first tier storage, having a low activity region;
a low performance storage device, in the second tier storage, having a high activity region;
a storage media interface module, coupled to the storage tier manager, for exchanging a physical block region data, accessed by the command from the system processor, corresponding to the high activity region in the low performance storage device with the physical block region corresponding to the low activity region in the high performance storage device, performed by the storage tier manager during an access of the high activity region data for the command, when the storage tier manager determines a priority exceeds a predetermined threshold; and wherein exchanging the physical block region data comprises the storage media interface module further configured to:
  copy the low activity region to a reserved section located in the first or the second tier storage;
  update the physical address of the low activity region in a virtual-to-physical table;
  copy the high activity region to the location in the first tier storage previously occupied by the low activity region;
  update the physical address of the high activity region in the virtual-to-physical table;
  copy the low activity region from the reserved section to the second tier storage previously occupied by the high activity region;
  update the physical address of the low activity region in the virtual-to-physical table.

12. The system as claimed in claim 11 further comprising a system processor coupled to the storage tier manager for generating usage statistics of the high performance storage device and the low performance storage device.

13. The system as claimed in claim 11 further comprising a promotion threshold module in the storage tier manager for determining the high activity region.

14. The system as claimed in claim 11 wherein the physical block region corresponding to the high activity region exchanged with the physical block region corresponding to the low activity region by the storage tier manager includes the virtual-to-physical table updated by the storage tier manager.

15. The system as claimed in claim 11 further comprising a media interface bus, coupled between the storage media interface module and the storage tier manager, for exchanging the physical block region corresponding to the high activity region with the physical block region corresponding to the low activity region.

16. The system as claimed in claim 11 further comprising:
  a promotion threshold module executed by the storage tier manager; and
  a virtual to physical list coupled to the storage tier manager.

17. The system as claimed in claim 16 further comprising a system processor, coupled to the storage tier manager, for generating the low activity region and the high activity region including an interface bus controller between the system processor and the storage tier manager.

18. The system as claimed in claim 16 further comprising a memory device, coupled to the storage tier manager, for keeping usage statistics on the high activity region and the low activity region.

19. The system as claimed in claim 16 wherein the physical block region corresponding to the high activity region exchanged with the physical block region corresponding to the low activity region by a block level storage processor includes the virtual-to-physical table in a memory device updated by the storage tier manager.

20. The system as claimed in claim 16 further comprising a media interface bus, coupled between the storage media interface module and the storage tier manager, for exchanging the physical block region corresponding to the high activity region with the physical block region corresponding to the low activity region includes a reserved section to copy the low activity region.

21. A non-transitory computer readable media comprising:
  receiving a command, from a system processor, through an interface bus;
  accessing a storage tier manager, based on the command from the system processor, coupled to a first tier storage and a second tier storage;
  identifying a low activity region in the first tier storage and a high activity region in the second tier storage;
  exchanging a physical block region data, accessed by the command from the system processor, corresponding to the high activity region with the physical block region corresponding to the low activity region, by the storage tier manager performing the exchange during the access of the data for the command, when the storage tier manager determines a priority exceeds a predetermined threshold; and,
  wherein exchanging the physical block region data comprises:
  copying the low activity region to a reserved section located in the first or the second tier storage;
  updating the physical address of the low activity region in a virtual-to-physical table;
  copying the high activity region to the location in the first tier storage previously occupied by the low activity region;
  updating the physical address of the high activity region in the virtual-to-physical table;
  copying the low activity region from the reserved section to the second tier storage previously occupied by the high activity region;
  updating the physical address of the low activity region in the virtual-to-physical table.

22. The non-transitory computer readable media as claimed in claim 21 further comprising generating usage statistics by the storage tier manager for identifying the low activity region and the high activity region.

23. The non-transitory computer readable media as claimed in claim 21 wherein exchanging the physical block region corresponding to the high activity region includes comparing usage statistics of the high activity region.

24. The non-transitory computer readable media as claimed in claim 21 wherein exchanging the physical block region corresponding to the high activity region with the physical block region corresponding to the low activity region by the storage tier manager includes updating the virtual-to-physical table by the storage tier manager.

25. The non-transitory computer readable media as claimed in claim 21 further comprising exchanging, by a storage media interface module, the physical block region corresponding to the high activity region with the physical block region corresponding to the low activity region.

* * * * *